(12) United States Patent
Panikkar et al.

(10) Patent No.: US 11,651,005 B2
(45) Date of Patent: May 16, 2023

(54) INTELLIGENT DATASTORE DETERMINATION FOR MICROSERVICE

(71) Applicant: EMC IP Holding Company LLC, Hopkinton, MA (US)

(72) Inventors: Shibi Panikkar, Bangalore (IN); Pratheek Veluswamy, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 93 days.

(21) Appl. No.: 16/865,631

(22) Filed: May 4, 2020

(65) Prior Publication Data
US 2021/0342358 A1 Nov. 4, 2021

(51) Int. Cl.
| | | |
|---|---|---|
| *G06F 16/00* | (2019.01) | |
| *G06F 16/25* | (2019.01) | |
| *G06N 20/00* | (2019.01) | |
| *G06F 16/27* | (2019.01) | |
| *G06F 16/23* | (2019.01) | |

(52) U.S. Cl.
CPC ........ *G06F 16/252* (2019.01); *G06F 16/2386* (2019.01); *G06F 16/256* (2019.01); *G06F 16/27* (2019.01); *G06N 20/00* (2019.01)

(58) Field of Classification Search
CPC ....... G06F 16/252; G06F 1/27; G06F 16/2386
See application file for complete search history.

(56) References Cited

U.S. PATENT DOCUMENTS

| | | | |
|---|---|---|---|
| 10,291,462 B1* | 5/2019 | Joyce | H04L 41/046 |
| 2010/0250491 A1* | 9/2010 | Jin | G06F 16/27 |
| | | | 707/634 |
| 2019/0324952 A1* | 10/2019 | Ying | G06F 16/2443 |
| 2020/0162578 A1* | 5/2020 | Appajanna | H04L 67/325 |
| 2020/0250203 A1* | 8/2020 | Calco | G06F 16/27 |
| 2021/0103581 A1* | 4/2021 | Lee | G06F 16/2365 |
| 2021/0211363 A1* | 7/2021 | Papacica | H04L 41/5041 |

OTHER PUBLICATIONS

Wikipedia, "Isolation (Database Systems)," https://en.wikipedia.org/w/index.php?title=Isolation_(database_systems)&oldid=, Apr. 25, 2020, 9 pages.

* cited by examiner

*Primary Examiner* — Khanh B Pham
(74) *Attorney, Agent, or Firm* — Ryan, Mason & Lewis, LLP (57) ABSTRACT

A method comprises dividing a plurality of operations of a microservice between a plurality of databases, and synchronizing data corresponding to the plurality of operations between the plurality of databases. The microservice is a create, read, update, delete (CRUD) microservice, and the plurality of operations comprise creating, reading, updating and deleting the data.

20 Claims, 6 Drawing Sheets

INTELLIGENT DATASTORE DETERMINATION FOR MICROSERVICE

FIELD

The field relates generally to information processing systems, and more particularly to data storage associated with microservices in information processing systems.

BACKGROUND

The concept of microservices is based on service-oriented software development wherein a software application program (application) is created as a set of loosely-coupled services. One example of a microservice is a CRUD microservice. CRUD stands for "Create, Read, Update, Delete" and is a data driven microservice wherein each operation (create, read, update, and delete) is a basic operation associated with persistent data storage. In current practice, a CRUD microservice is single microservice performed for a single data object in a single database (datastore). That is, create, read, update and delete operations of the microservice are performed in accordance with the same database, i.e., the data object is accessed in the given database, CRUD operations are performed as needed, and the result is effectuated in the given database (e.g., data object updated or deleted). Since the CRUD microservice is performed for a single data object in a single database, as the data object grows, the read, update and delete operations will experience performance issues, and hence the performance of the CRUD microservice will be compromised.

SUMMARY

Illustrative embodiments provide techniques for improved microservice management in an information processing system.

In one embodiment, a method comprises dividing a plurality of operations of a microservice between a plurality of databases, and synchronizing data corresponding to the plurality of operations between the plurality of databases. The microservice is a create, read, update, delete (CRUD) microservice, and the plurality of operations comprise creating, reading, updating and deleting the data.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" refers to a set of subroutine definitions, protocols, and/or tools for building software. Generally, an API defines communication between software components. APIs permit programmers to write software applications consistent with an operating environment or website.

In an illustrative embodiment, an intelligent database (datastore) connection engine is configured to, for a given microservice with multiple operations, bind a given one of the operations of the given microservice to a selected best-fit database. Thus, different operations of the given microservice can be bound to different databases. In illustrative embodiments, determination of the best-fit database for each of the operations of the given microservice is based on one or more of a given user configuration and one or more AI/ML algorithms.

Accordingly, in an illustrative embodiment wherein the given microservice is a CRUD microservice, a methodology is provided that intelligently optimizes each CRUD operation in different types of databases as needed.

Figure 1:
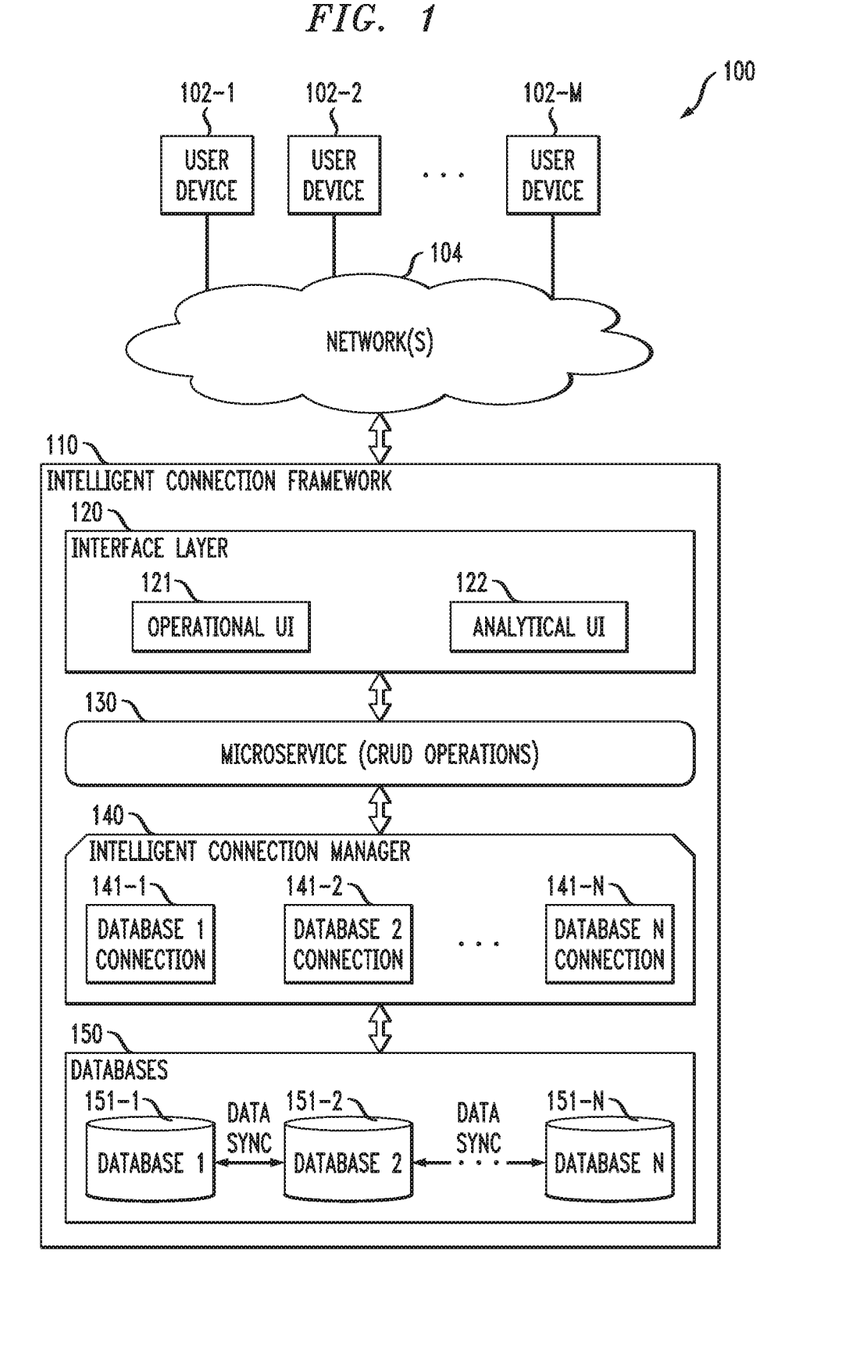
FIG. 1 depicts details of an information processing system with an intelligent connection framework for assigning different databases to microservice operations according to an illustrative embodiment.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with an intelligent connection framework 110.

The user devices 102 can comprise, for example, Internet of Things (IoT) devices, desktop, laptop or tablet computers, mobile telephones, or other types of processing devices capable of communicating with the intelligent connection framework 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L and N are assumed to be arbitrary positive integers greater than or equal to two.

The terms "client" or "user" herein are intended to be broadly construed so as to encompass numerous arrangements of human, hardware, software or firmware entities, as well as combinations of such entities. Microservice management services may be provided for users utilizing one or more AWL models, although it is to be appreciated that other types of infrastructure arrangements could be used. At least a portion of the available services and functionalities provided by the intelligent connection framework 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the intelligent connection framework 110, as well as to support communication between the intelligent connection framework 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the intelligent connection framework 110.

The intelligent connection framework 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The intelligent connection framework 110, on behalf of respective infrastructure tenants each corresponding to one or more users associated with respective ones of the user devices 102 provides a platform for using AI/ML to, for a given microservice with multiple operations, bind a given one of the operations of the given microservice to a selected best-fit database. As explained further herein, different operations of the given microservice can be bound to different databases depending on a variety of factors.

Referring to FIG. 1, the intelligent connection framework 110 comprises an interface layer 120, a microservice layer 130, an intelligent connection manager 140 and a databases layer 150. The interface layer 120 includes an operational user interface (UI) component 121 and an analytical UI component 122. The intelligent connection manager 140 includes a plurality of database connection components 141-1, 141-2, . . . 141-N (collectively "database connection components 141"), and the databases layer 150 includes a plurality of databases 151-1, 151-2, . . . 151-N (collectively "databases 151").

According to one or more embodiments, the operational and analytical UI components 121 and 122 interface with the microservice layer 130 to call APIs (e.g., representational state transfer (REST) APIs) corresponding to microservices in the microservices layer 130. The requests of the operational and analytical UI components 121 and 122 are based on different data needs of operational and analytical UIs that may appear on the user devices 102. For example, an operational UI can display data relating to the monitoring and management of enterprise operations and processes, so that enterprise personnel can visualize real-time data issues that may need to be addressed. In some examples, an operational UI may require data related to the monitoring and analysis of the activities of an enterprise in a given area that is to be viewed by subject matter experts. An analytical UI may display large volumes of data created and used by enterprises to provide comprehensive overviews to, for example, identify trends and generate predictions and targets. Analytical UIs may format the display of large amounts of data in different subject matter areas.

Based on the needs of the operational and analytical UIs, the operational and analytical UI components 121 and 122 may request different types of CRUD operations from the microservice layer. For example, in connection with an analytical UI, the analytical UI component 122 may require reads of large volumes of data, requiring a different database than reads for an operational UI, which may have smaller data volume needs than those of an analytical UI.

The microservice layer 130 is configured as a microservice-based software architecture composed of multiple different fine-grained services with lightweight protocols, whereby microservices corresponding to different features of an application may be independently developed, deployed and scaled. For example, the operational and analytical UI components 121 and 122 route requests for CRUD operations to the appropriate microservice of the microservice layer 130. The microservice layer 130 can process user requests received through UIs (e.g., the operational and analytical UIs) on user devices 102 by invoking multiple microservices from one or more back-ends and compiling the results. The UIs on the user devices 102, such as, for example, operational and analytical UIs, are generated and managed by the interface layer 120, including UI components, such as, for example, the operational and analytical UI components 121 and 122. According to an embodiment, the operational and analytical UI components 121 and 122, and/or the microservice layer 130 may be hosted in a cloud platform server.

Figure 2:
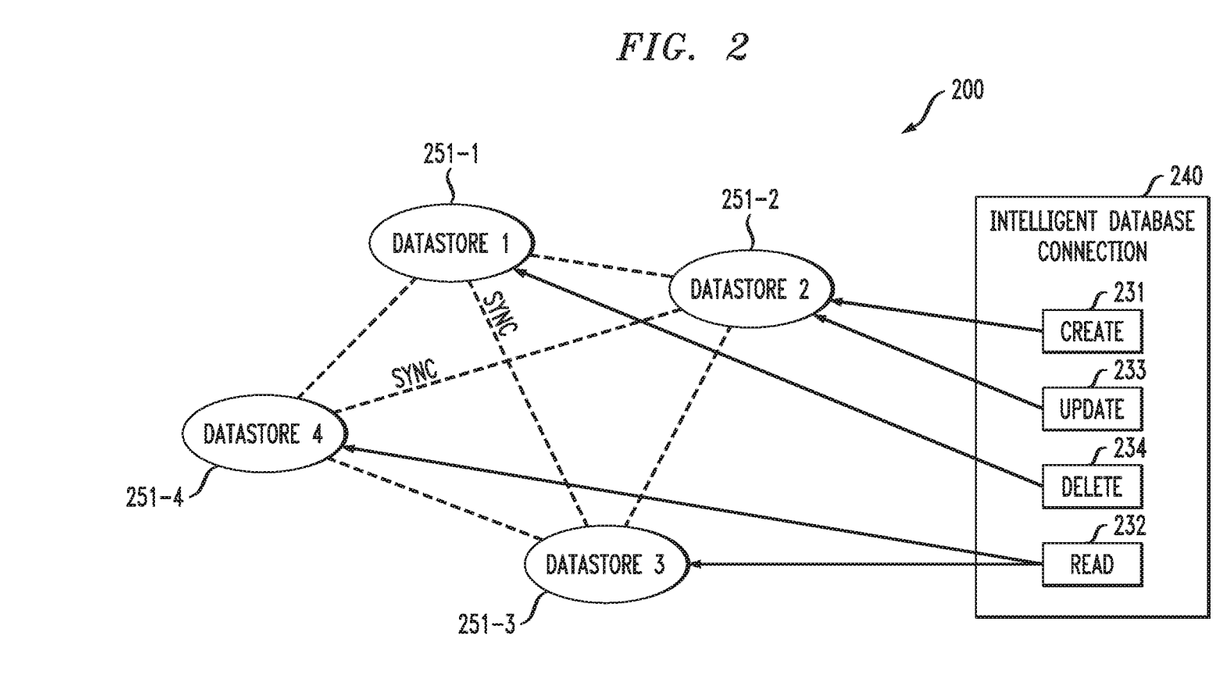
FIG. 2 depicts details of an information processing system with intelligent datastore determination for microservice management according to an illustrative embodiment.

The microservice layer 130, through the intelligent connection manager 140, connects different operations with different databases 151 to retrieve data associated with different microservice operations, such as the CRUD operations. Referring to FIG. 2, in some illustrative embodiments, in an information processing system 200, the databases can comprise a web of datastores 251-1, 251-2, 251-3 and 251-4 (collectively "datastores 251") combined in a blockchain architecture to enable data to be synchronized across the multiple databases. In some embodiments, examples of databases 151 or datastores 251 that are connected as part of a blockchain architecture and selected as a best fit for a given operation of a multi-operation microservice include, but are not limited to, Oracle®, Cassandra®, Mongo®, Elastic, PostgreSQL®, memSQL®, MS SQL, etc. databases.

Referring to FIGS. 1 and 2, the intelligent connection manager 140 and the intelligent database connection manager 240 divide a plurality of operations of a microservice between a plurality of databases 151 or datastores 251. The plurality of operations comprises, for example, a data create operation 231, a data read operation 232, a data update operation 233 and a data delete operation 234. As shown in FIGS. 1 and 2, the data corresponding to the plurality of operations is synchronized between the plurality of databases 151 or datastores 251. As noted above, the databases 151 and/or datastores 251 can be combined in a blockchain architecture to enable data to be synchronized across the multiple databases/datastores. The synchronizing may be performed in real-time and/or near real-time with respect to when the plurality of operations are is executed in the databases 151 or datastores 251.

Referring to FIG. 1, the database connection components 141 of the intelligent connection manager 140 bind one or more of a plurality of operations of a microservice to a given one of the plurality of databases. For example, in a non-limiting example, the database connection component 141-1 may bind a create operation and/or a first type of read operation to a database 151-1, the database connection component 141-2 may bind a second type of read operation and/or an update operation to a database 151-2, and the database connection component 141-N may bind a delete operation to a database 151-N. To which database an operation is bound can depend on a variety of factors or user configurations, including but not necessarily limited to, the type of operation (e.g., bulk operation, dirty read, etc.), the properties of the database and whether the database is equipped to certain types of operations. For example, some databases may be better equipped to accommodate large volume reads, concurrent operations and/or dirty reads. The number of databases 151 and/or database connection components 141 may vary.

In determining to which of a given one of the databases 151 a given one of the plurality of operations is to be bound, the intelligent connection manager 140 is configured to consider one or more configurations that may be specified by a user, an application and/or a service level agreement (SLA). The configurations include, for example, a requirement for concurrency of one or more of the plurality of operations, a requirement for a bulk operation, a requirement for how the data is read, and/or an isolation level requirement. For example, a requirement for concurrency may specify a concurrent read operation by multiple processors from the same memory location, a concurrent write operation by multiple processors from the same memory location, concurrent write and update operations, etc. A requirement for a bulk operation may specify, for example, a bulk read operation, a bulk write operation, etc. A requirement for how data is read may specify, for example, a requirement for a dirty read (e.g., uncommitted dependency), occurring when data is read from a row that has been modified by another running transaction and not yet committed, a non-repeatable read, a phantom read, etc. An isolation level requirement relates to, for example, how and/or when changes made by one operation become visible to certain users and/or systems.

For example, isolation levels may define whether data being operated on in a first operation is visible to other systems and/or users carrying out concurrent operations related to the data being operated on. Lower isolation levels correspond to an increased ability of different users/systems to access the same data at the same time. Conversely, higher isolation levels reduce the types of concurrency effects that users/systems may encounter, but require more system resources and increase the chances that one transaction will block another transaction.

Figure 3:
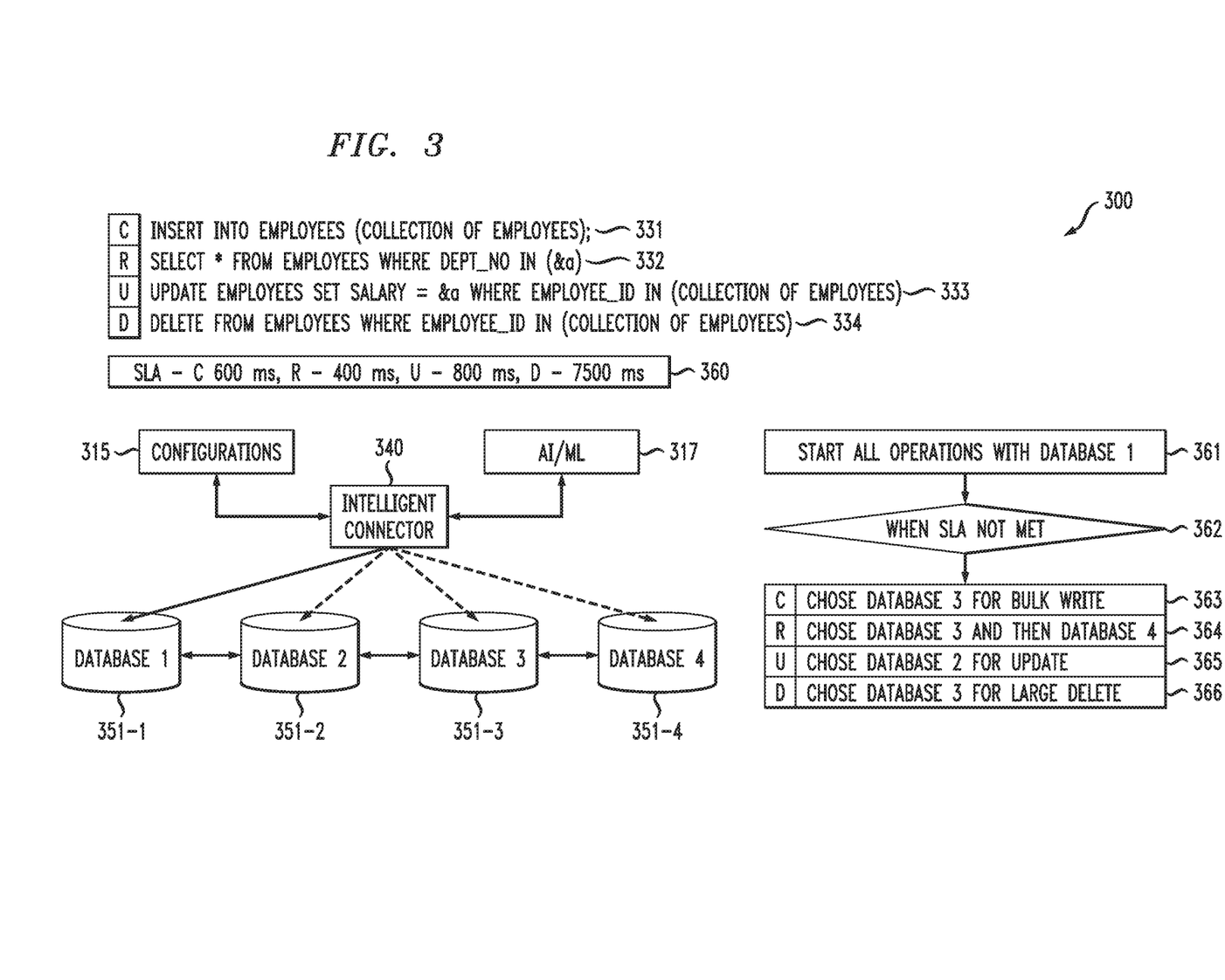
FIG. 3 depicts details of a CRUD microservice management methodology with intelligent database determination according to an illustrative embodiment.

FIG. 3 depicts details of a CRUD microservice management methodology 300 with intelligent database determination according to an illustrative embodiment. For example, as shown, for a given operation based on configuration data 315 or AWL input 317 to improve performance, an intelligent database connection engine (manager) 340 (the same or similar to connection managers 140 and 240) binds a microservice to a selected best-fit (e.g., optimal) database of a plurality of databases 351-1, 351-2, 351-3 and 351-4 (collectively "databases 351"). The databases 351 are the same or similar to the databases 151 and/or datastores 251. As shown by the double-sided arrows between the databases 351, the databases 351 can be arranged in a blockchain architecture so that data can be synchronized between the databases 351.

As shown in FIG. 3, in a non-limiting operational example, an SLA 360 has time constraint requirements for create, read, update and delete operations 331, 332, 333 and 334 in connection with employee data. For example, according to the SLA 360, the create operation 331 should not exceed 600 ms, the read operation 332 should not exceed 400 ms, the update operation 333 should not exceed 800 ms and the delete operation 334 should not exceed 7500 ms.

In accordance with the embodiment in FIG. 3, the CRUD operations 331, 332, 333 and 334 are started in database 1 351-1 at block 361. However, upon a determination that the SLA 360 is not being met (block 362), the CRUD operations 331-334 are divided among database 2 351-2, database 3 351-3 and database 4 351-4 in order to ensure compliance with the SLA 360. More specifically, referring to block 363, database 3 351-3 is bound to a bulk write (create) operation, referring to block 364, database 3 351-3 and then database 4 351-4 are bound to the read operation, referring to block 365, database 2 351-2 bound to the update operation, and, referring to block 366, database 3 351-3 is bound to a large volume delete operation.

The determination of the databases 351 is based on the configuration specifications 315 (e.g., concurrency, type of operation, volume of operation, isolations, SLA, etc. as described herein) and AI/ML determinations 317.

Figure 4:
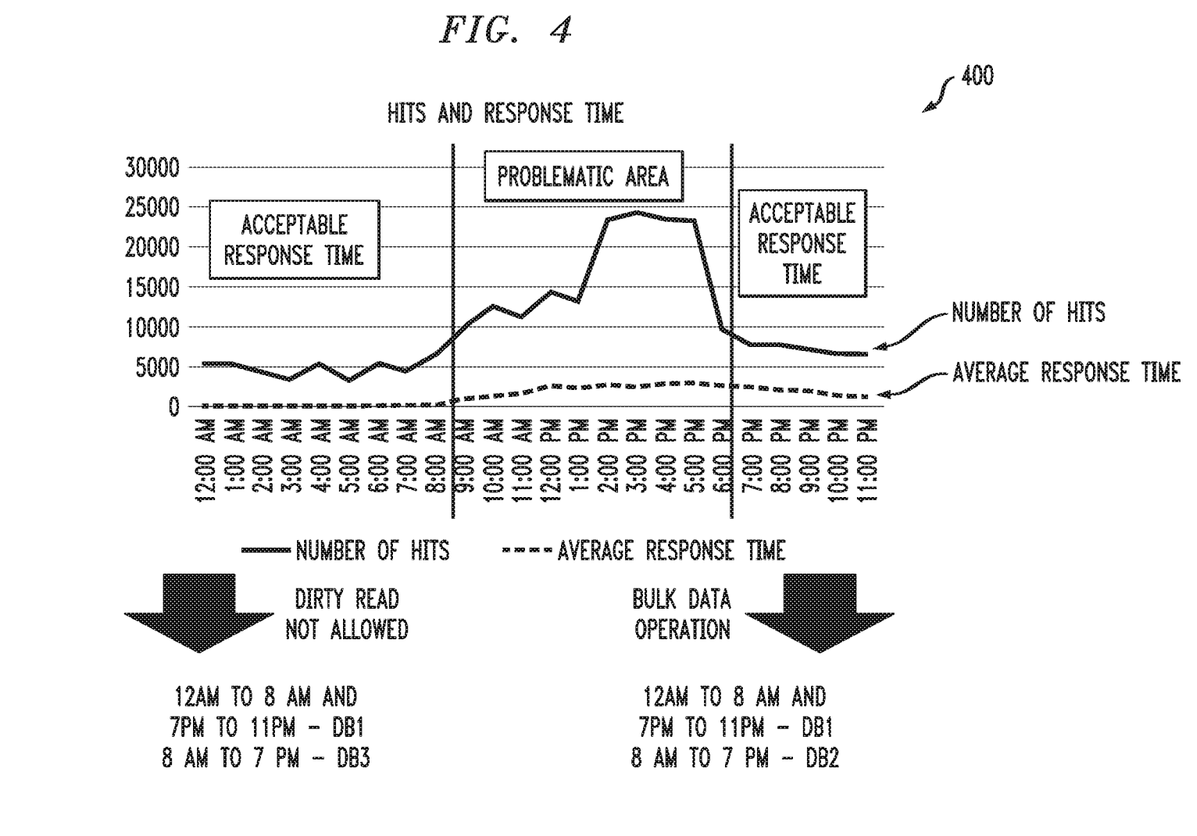
FIG. 4 depicts a graph of hits and response time to determine problematic time periods when assigning microservice operations to databases according to an illustrative embodiment.
Figure 5:
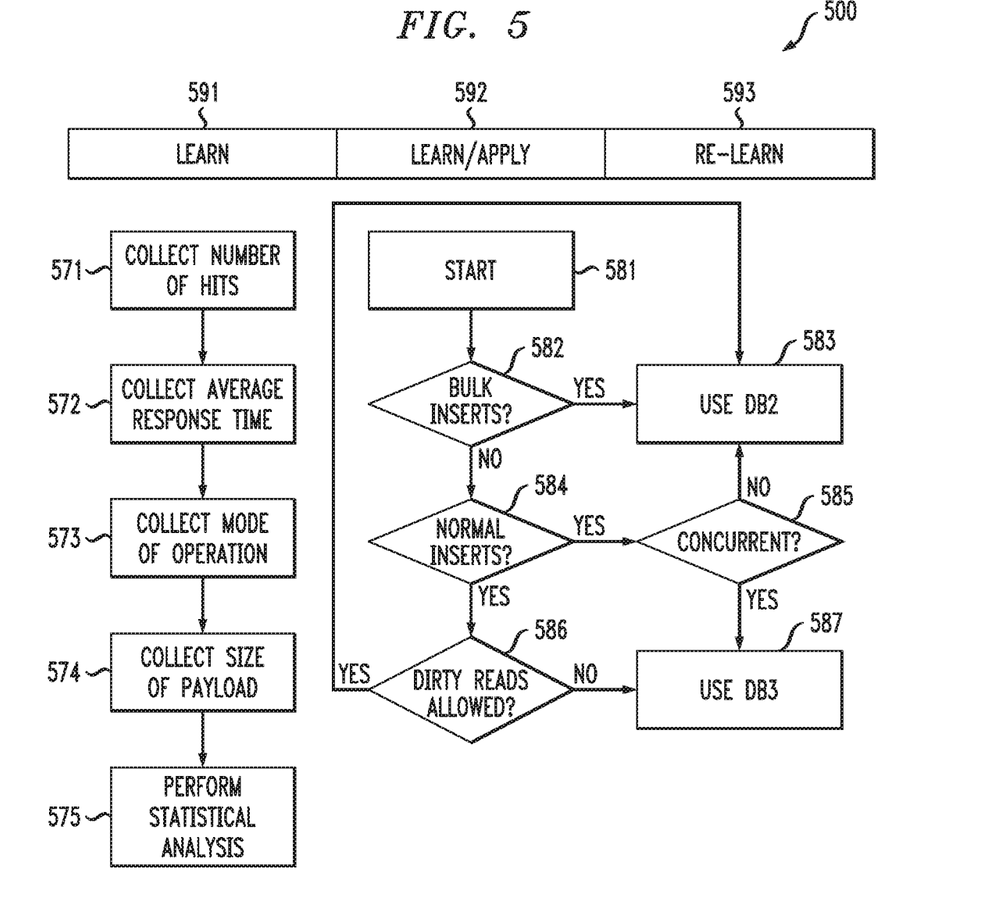
FIG. 5 depicts a process for using artificial intelligence/machine learning (AI/ML) to assign microservice operations to databases according to an illustrative embodiment.

Referring, for example, to FIGS. 4 and 5, the intelligent connection managers 140, 240 and 340 are configured to use AI/ML techniques to learn how to assign and/or shift/change to the optimal (e.g., best-fit) databases/datastores 151/251/351 for given operations based on, for example, the type of operation, time of operation, configurations and/or data involved. According to an embodiment, data including one or more of a type of the given one of the plurality of operations and response times of the given one of the plurality of operations over a time period is inputted into one or more AI/ML algorithms. In addition, statistics including one or more of a number of times the data is being accessed and a payload size of the data is inputted into one or more AI/ML algorithms. The AI/ML algorithms include, but are not necessarily limited to, a random forest regressor model, a support vector machine (SVM) and/or neural networks.

For example, FIG. 4 shows a graph 400 of hits and response times to determine problematic time periods when assigning microservice operations to databases. A number of hits refers to, for example, the number of times operations are being performed (e.g., creates (writes), reads, updates and deletions) on data over a given time period. As can be understood from FIG. 4, the number of hits and response times are low during generally off-peak time periods of 12 am to 8 am and 7 pm to 11 pm, and the number of hits and response times are higher during the peak time period of 8 am to 7 pm. Due to the higher number of hits and longer response times, the peak time period is identified as a problematic area by the one or more AI/ML algorithms. Accordingly, using the one or more AI/ML algorithms, the intelligent connection manager 140/240/340 is able to recognize that changing from the off-peak to the peak time period requires a change of database from a first database (DB1) to a second database (DB2) or to a third database (DB3) for the performance of certain microservice operations. For example, based on historical data, the one or more AI/ML algorithms are able to determine that the second database (DB2) is better suited for bulk data operations during the peak time period, and that the third database (DB3) is better suited for operations where dirty reads are not permitted during the peak time period.

FIG. 5 depicts a process 500 for using AI/ML to assign microservice operations to databases according to an illustrative embodiment. In connection with FIG. 4, FIG. 5 shows a process 500 for using one or more AWL algorithms to recognize that changing from the off-peak to the peak time period requires a change of database from the first database (DB1) to the second database (DB2) or to the third database (DB3) for the performance of certain microservice operations. For example, referring to blocks 571, 572, 573 and 574, the intelligent connection manager 140/240/340 collects data on the number of hits (e.g., a number of times the data is being accessed), average response time of one or more of the plurality of operations over a time period, a type (mode) of operation of the one or more of the plurality of operations, and a payload size of the data corresponding to the one or more of the plurality of operations. Referring to block 575 the collected data is inputted into the one or more AI/ML algorithms and statistical analysis is performed.

Following the flow in connection with blocks 581, 582, 583, 584, 585, 586 and 587, the intelligent connection manager 140/240/340, using the results of the statistical analysis and the one or more AI/ML algorithms, determines to which databases certain microservice operations should be bound to given one or more constraints. The flow begins at block 581. If bulk inserts are required (block 582), then database 2 (DB2) is used (block 583). If bulk inserts are not a requirement, and normal inserts are used (block 584), then a determination is made whether concurrency is a requirement (block 585). If concurrency is not a requirement, then database 2 (DB2) is used (block 583). If concurrency is a requirement, then database 3 (DB3) is used (block 587). In addition, if bulk inserts are not requirement, and normal inserts are used (block 584), then a determination is made whether dirty reads are permitted (block 586). If dirty reads are permitted, then database 2 (DB2) is used (block 583). If dirty reads are not permitted, then database 3 (DB3) is used (block 587). As can be seen in FIG. 5, the application of the one or more machine learning algorithms includes processes of learning 591 based on collected data, learning and applying results 592, and re-learning 593 based on feedback.

According to one or more embodiments, the databases 151, datastores 251 and databases 351 can be configured according to a relational database management system (RDBMS) (e.g., PostgreSQL). The databases 151, datastores 251 and databases 351 in some embodiments are implemented using one or more storage systems or devices associated with the intelligent connection framework 110. In some embodiments, one or more of the storage systems utilized to implement the databases 151, datastores 251 and databases 351 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as an element of the intelligent connection framework 110, the intelligent connection manager 140 in other embodiments can be implemented at least in part externally to the intelligent connection framework 110, for example, as a stand-alone server, set of servers or other type of system coupled to the network 104. For example, the intelligent connection manager 140 may be provided as a cloud service accessible by the intelligent connection framework 110.

The intelligent connection manager 140 in the FIG. 1 embodiment is assumed to be implemented using at least one processing device. Each such processing device generally comprises at least one processor and an associated memory, and implements one or more functional modules for controlling certain features of intelligent connection manager 140.

Although shown as elements of the intelligent connection framework 110, the interface layer 120, microservice layer 130, intelligent connection manager 140 and/or databases layer 150 in other embodiments can be implemented at least in part externally to the intelligent connection framework 110, for example, as stand-alone servers, sets of servers or other types of systems coupled to the network 104. For example, the interface layer 120, microservice layer 130, intelligent connection manager 140 and/or databases layer 150 may be provided as cloud services accessible by the intelligent connection framework 110.

The interface layer 120, microservice layer 130, intelligent connection manager 140 and/or databases layer 150 in the FIG. 1 embodiment are each assumed to be implemented using at least one processing device. Each such processing device generally comprises at least one processor and an associated memory, and implements one or more functional modules for controlling certain features of the interface layer 120, microservice layer 130, intelligent connection manager 140 and/or databases layer 150.

At least portions of the intelligent connection framework 110 and the components thereof may be implemented at least in part in the form of software that is stored in memory and executed by a processor. The intelligent connection framework 110 and the components thereof comprise further hardware and software required for running the intelligent connection framework 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the interface layer 120, microservice layer 130, intelligent connection manager 140, databases layer 150 and other components of the intelligent connection framework 110 in the present embodiment are shown as part of the intelligent connection framework 110, at least a portion of the interface layer 120, microservice layer 130, intelligent connection manager 140, databases layer 150 and other components of the intelligent connection framework 110 in other embodiments may be implemented on one or more other processing platforms that are accessible to the intelligent connection framework 110 over one or more networks. Such components can each be implemented at least in part within another system element or at least in part utilizing one or more stand-alone components coupled to the network 104.

It is assumed that the intelligent connection framework 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the interface layer 120, microservice layer 130, intelligent connection manager 140, databases layer 150 and other components of the intelligent connection framework 110, and the elements thereof can each be implemented in the form of one or more LXCs running on one or more VMs. Other arrangements of one or more processing devices of a processing platform can be used to implement the interface layer 120, microservice layer 130, intelligent connection manager 140 and databases layer 150, as well as other components of the intelligent connection framework 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the intelligent connection framework 110 to reside in different data centers. Numerous other distributed implementations of the intelligent connection framework 110 are possible.

Accordingly, one or each of the interface layer 120, microservice layer 130, intelligent connection manager 140, databases layer 150 and other components of the intelligent connection framework 110 can each be implemented in a distributed manner so as to comprise a plurality of distributed components implemented on respective ones of a plurality of compute nodes of the intelligent connection framework 110.

It is to be appreciated that these and other features of illustrative embodiments are presented by way of example only, and should not be construed as limiting in any way.

Accordingly, different numbers, types and arrangements of system components such as the interface layer 120, microservice layer 130, intelligent connection manager 140, databases layer 150 and other components of the intelligent connection framework 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the intelligent connection framework can be offered to cloud infrastructure customers or other users as part of FaaS, CaaS and/or PaaS offerings.

Figure 6:
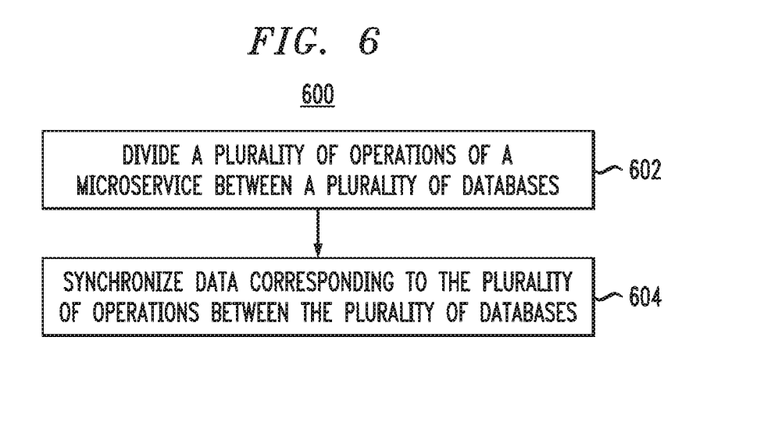
FIG. 6 depicts a process for assigning microservice operations to different databases according to an illustrative embodiment.

The operation of the information processing system 100 and/or 200 will now be described in further detail with reference to the flow diagram of FIG. 6. With reference to FIG. 6, a process 600 for assigning microservice operations to different databases as shown includes steps 602 and 604, and is suitable for use in the system 100 and/or 200 but is more generally applicable to other types of information processing systems comprising an intelligent connection framework configured for assigning microservice operations to different databases.

In step 602, a plurality of operations of a microservice are divided between a plurality of databases. The microservice is a CRUD microservice, and the plurality of operations comprise creating, reading, updating and deleting the data. The dividing step comprises binding a given one of the plurality of operations of the microservice to a given one of the plurality of databases.

In step 604, data corresponding to the plurality of operations is synchronized between the plurality of databases. According to one or more embodiments, the synchronizing is performed in at least one of real-time and near real-time with respect to performance of the plurality of operations. The plurality of databases can be combined in a blockchain architecture.

It is to be appreciated that the FIG. 6 process and other features and functionality described above can be adapted for use with other types of information systems configured to execute microservice management services in an intelligent connection framework or other type of framework.

The particular processing operations and other system functionality described in conjunction with the flow diagram of FIG. 6 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an intelligent connection framework as disclosed herein can provide a number of significant advantages relative to conventional arrangements. For example, unlike conventional techniques, instead of using a single database for multiple microservice operations, the embodiments provide a web of more than one database (webbed datastore) that are connected as part of a blockchain architecture and selected as a best fit for a given operation of a multi-operation microservice.

Advantageously, the embodiments provide an intelligent database connection manager which binds a given microservice operation to the appropriate (e.g., best-fit) database based on configuration and/or AI/ML techniques to improve performance. For example, when using conventional techniques tied to a single database, as data grows, read, update and delete operations will encounter performance issues, thereby compromising the performance of the microservices. The embodiments advantageously prevent the performance issues of the conventional techniques by binding different operations (e.g., CRUD operations) to different databases based on multiple factors, such as, but not necessarily limited to, a requirement for concurrency of one or more of the plurality of operations, a requirement for a bulk operation, a requirement for how the data is read, and/or an isolation level requirement. The embodiments further advantageously synchronize the data between the plurality of databases that have been used for the plurality of operations.

In addition, the embodiments advantageously leverage AI/ML, techniques to learn the optimal databases for given operations based, for example, on the type of operation, time of operation, and data involved, and to generate or shift the connection to the best-fit database as required.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the intelligent connection framework 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an intelligent connection framework in illustrative embodiments. These and other cloud-based systems in illustrative embodiments can include object stores.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
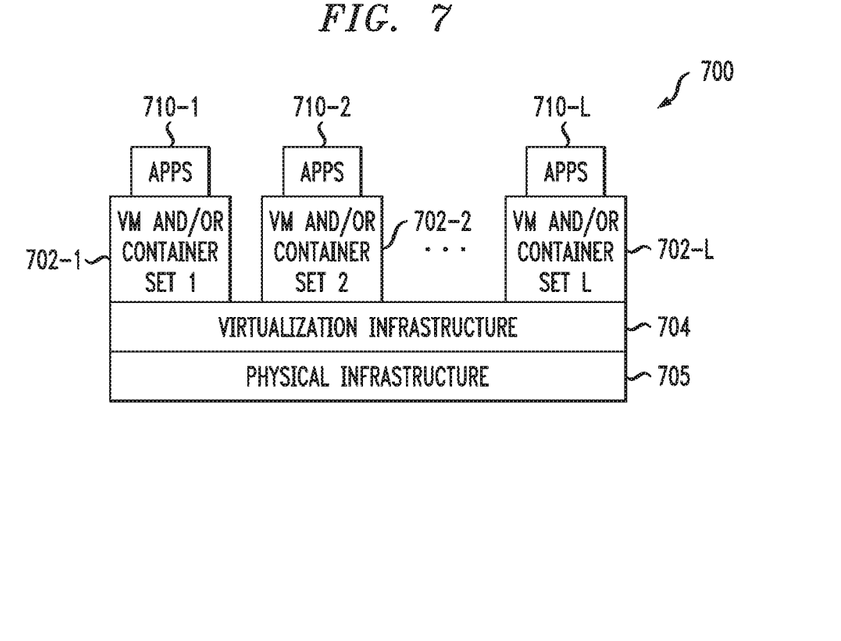
FIGS. 7 and 8 show examples of processing platforms that may be utilized to implement at least a portion of an information processing system in illustrative embodiments.
Figure 8:
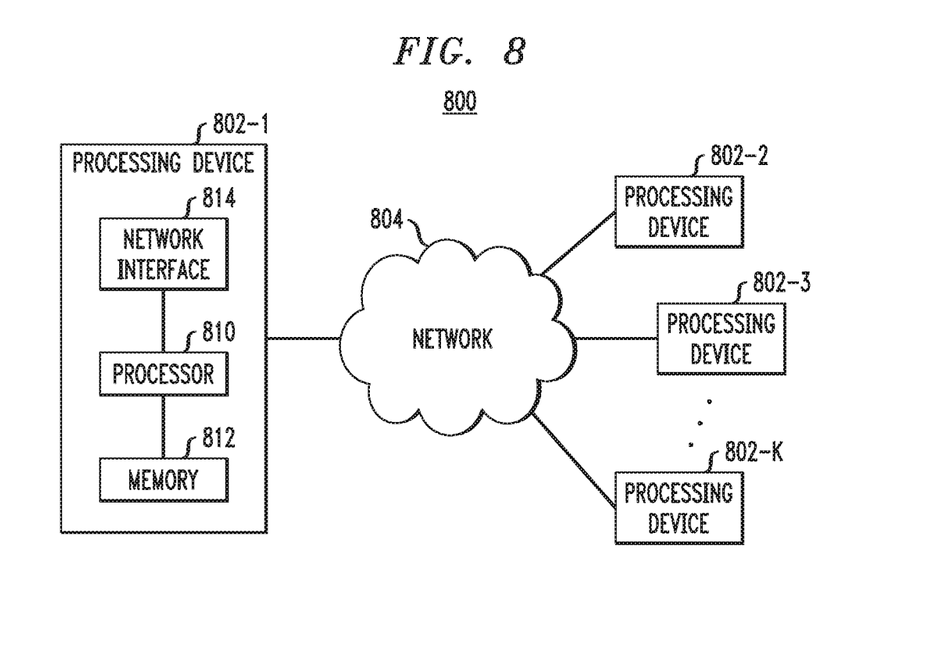

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the intelligent connection framework 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and intelligent connection frameworks. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
identifying at least a given single microservice of a plurality of microservices, the single microservice comprising a plurality of operations;

dividing instances of the plurality of operations of the single microservice between a plurality of databases, the plurality of databases being combined in a blockchain architecture; and causing synchronization of data corresponding to the plurality of operations across the plurality of databases, wherein the synchronized data is accessible to each database of the plurality of databases in the blockchain architecture;

wherein the single microservice is a create, read, update, delete (CRUD) microservice, and the plurality of operations comprise creating, reading, updating and deleting the data;

wherein dividing the instances of the plurality of operations comprises assigning a first instance of a given one of the creating, reading, updating and deleting operations of the CRUD microservice to a first database of the plurality of databases and assigning at least a second instance of the given one of the creating, reading, updating and deleting operations of the CRUD microservice to a second database of the plurality of databases, the first database comprising a first database type and the second database comprising a second database type different than the first database type; and wherein the steps of the method are executed by a processing device operatively coupled to a memory.

2. The method of claim 1, wherein the causing synchronization is performed in at least one of real-time and near real-time with respect to performance of the plurality of operations.

3. The method of claim 1, wherein the dividing comprises binding a given instance of one of the plurality of operations of the single microservice to a given one of the plurality of databases.

4. The method of claim 3, further comprising determining the given one of the plurality of databases for the given instance of said one of the plurality of operations based on one or more artificial intelligence/machine learning (AI/ML) algorithms.

5. The method of claim 4, further comprising inputting into the one or more AI/ML algorithms data including one or more of a type of the given instance of said one of the plurality of operations and response times of the given instance of said one of the plurality of operations over a time period.

6. The method of claim 5, further comprising inputting into the one or more AI/ML algorithms statistics including one or more of a number of times the data is being accessed and a payload size of the data.

7. The method of claim 3, further comprising determining the given one of the plurality of databases for the given instance of said one of the plurality of operations based on at least one user configuration.

8. The method of claim 7, wherein the at least one user configuration comprises a requirement for concurrency of one or more of the plurality of operations.

9. The method of claim 7, wherein the at least one user configuration comprises a requirement for a bulk operation on the data.

10. The method of claim 7, wherein the at least one user configuration comprises a requirement for how the data is read.

11. The method of claim 7, wherein the at least one user configuration comprises an isolation level requirement.

12. The method of claim 1, further comprising determining whether terms of a service level agreement (SLA) have been met for the plurality of operations.

13. An apparatus comprising:
a processing device operatively coupled to a memory and configured to:
identifying at least a given single microservice of a plurality of microservices, the single microservice comprising a plurality of operations;
dividing instances of the plurality of operations of the single microservice between a plurality of databases, the plurality of databases being combined in a blockchain architecture; and
causing synchronization of data corresponding to the plurality of operations across the plurality of databases wherein the synchronized data is accessible to each database of the plurality of databases in the blockchain architecture;
wherein the single microservice is a create, read, update, delete (CRUD) microservice, and the plurality of operations comprise creating, reading, updating and deleting the data; and
wherein dividing the instances of the plurality of operations comprises assigning a first instance of a given one of the creating, reading, updating and deleting operations of the CRUD microservice to a first database of the plurality of databases and assigning at least a second instance of the given one of the creating, reading, updating and deleting operations of the CRUD microservice to a second database of the plurality of databases, the first database comprising a first database type and the second database comprising a second database type different than the first database type.

14. The apparatus of claim 13, wherein, in dividing, the processing device is configured to bind a given instance of one of the plurality of operations of the single microservice to a given one of the plurality of databases.

15. The apparatus of claim 14, wherein the processing device is further configured to determine the given one of the plurality of databases for the given instance of said one of the plurality of operations based on at least one of one or more user configurations and one or more artificial intelligence/machine learning (AI/ML) algorithms.

16. An article of manufacture comprising a non-transitory processor-readable storage medium having stored therein program code of one or more software programs, wherein the program code when executed by at least one processing device causes said at least one processing device to perform the steps of:
identifying at least a given single microservice of a plurality of microservices, the single microservice comprising a plurality of operations;
dividing instances of the plurality of operations of the single microservice between a plurality of databases, the plurality of databases being combined in a blockchain architecture; and
causing synchronization of data corresponding to the plurality of operations across the plurality of databases wherein the synchronized data is accessible to each database of the plurality of databases in the blockchain architecture;
wherein the single microservice is a create, read, update, delete (CRUD) microservice, and the plurality of operations comprise creating, reading, updating and deleting the data; and
wherein dividing the instances of the plurality of operations comprises assigning a first instance of a given one of the creating, reading, updating and deleting operations of the CRUD microservice to a first database of the plurality of databases and assigning at least a second instance of the given one of the creating, reading, updating and deleting operations of the CRUD microservice to a second database of the plurality of databases, the first database comprising a first database type and the second database comprising a second database type different than the first database type.

17. The article of manufacture of claim 16, wherein causing synchronization is performed in at least one of real-time and near real-time with respect to performance of the plurality of operations.

18. The article of manufacture of claim 16, wherein, in dividing, the processing device is configured to bind a given instance of one of the plurality of operations of the single microservice to a given one of the plurality of databases.

19. The article of manufacture of claim 18, wherein the processing device is further configured to determine the given one of the plurality of databases for the given instance of said one of the plurality of operations based on at least one of one or more user configurations and one or more artificial intelligence/machine learning (AI/ML) algorithms.

20. The articular of manufacture of claim 18, wherein the processing device is further configured to determine the given one of the plurality of databases for the given instance of said one of the plurality of operations based on at least one user configuration.

* * * * *